(12) United States Patent
Kolay et al.

(10) Patent No.: US 10,410,246 B2
(45) Date of Patent: Sep. 10, 2019

(54) SYSTEMS, METHODS, AND DEVICES FOR SPEND CONTROL IN ONLINE ADVERTISING

(71) Applicant: Amobee, Inc., Redwood City, CA (US)

(72) Inventors: Santanu Kolay, Redwood City, CA (US); Christos Koufogiannakis, Redwood City, CA (US); Ali Dasdan, Redwood City, CA (US); Shiyong Cheng, Redwood City, CA (US); Lawrence Lo, Redwood City, CA (US)

(73) Assignee: Amobee, Inc., Redwood City, CA (US)

( * ) Notice: Subject to any disclaimer, the term of this patent is extended or adjusted under 35 U.S.C. 154(b) by 534 days.

(21) Appl. No.: 14/941,272

(22) Filed: Nov. 13, 2015

(65) Prior Publication Data

US 2017/0140422 A1    May 18, 2017

(51) Int. Cl.
  *G06Q 30/02*    (2012.01)
(52) U.S. Cl.
  CPC ..... *G06Q 30/0247* (2013.01); *G06Q 30/0275* (2013.01); *G06Q 30/0277* (2013.01)
(58) Field of Classification Search
  CPC . G06Q 30/02; G06Q 30/0247; G06Q 30/0275
  See application file for complete search history.

(56) References Cited

U.S. PATENT DOCUMENTS

| 8,719,082 | B1* | 5/2014 | Snyder | G06Q 30/0275 |
| | | | | 705/14.1 |
| 2012/0041816 | A1* | 2/2012 | Buchalter | G06Q 30/02 |
| | | | | 705/14.41 |
| 2012/0158553 | A1* | 6/2012 | Sudhidhanakul | G06Q 10/087 |
| | | | | 705/28 |
| 2017/0098236 | A1* | 4/2017 | Lee | G06Q 30/0244 |

OTHER PUBLICATIONS

Rodriguez et al., "Method and System for Campaign Optimization and Bid Management in Online Advertising" (published in The IP.com Prior Art Database on Apr. 29, 2011) (Year: 2011).*

* cited by examiner

*Primary Examiner* — James M Detweiler
*Assistant Examiner* — Patrick Kim
(74) *Attorney, Agent, or Firm* — Kwan & Olynick LLP

(57) ABSTRACT

Systems, methods, and devices are disclosed herein for spend control in online advertising. Systems include a first plurality of advertisement servers included in a first data center, and a second plurality of advertisement servers included in a second data center. Systems include a performance data aggregator configured to receive performance data characterizing bids placed by the first plurality of advertisement servers and the second plurality of advertisement servers. Systems include a spend control analyzer configured to generate spend control data objects based on an estimate of bidding activity associated with the first data center and bidding activity associated with the second data center. Spend control data objects are capable of configuring advertisement servers to perform advertisement operations within determined budgetary constraints. The spend control analyzer is configured to provide the plurality of spend control data objects to the first plurality of advertisement servers and the second plurality of advertisement servers.

14 Claims, 8 Drawing Sheets

SYSTEMS, METHODS, AND DEVICES FOR SPEND CONTROL IN ONLINE ADVERTISING

TECHNICAL FIELD

This disclosure generally relates to online advertising, and more specifically to spend control associated with online advertising.

BACKGROUND

In online advertising, internet users are presented with advertisements as they browse the internet using a web browser or mobile application. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are purchased on a daily basis through public auctions hosted by real time bidding (RTB) exchanges. In many instances, a decision by an advertiser regarding whether to submit a bid for a selected RTB ad request is made in milliseconds. Advertisers often try to buy a set of ad impressions to reach as many targeted users as possible. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion.

SUMMARY

Various systems, methods, and devices are disclosed herein for implementing spend control in online advertising. Systems may include a first plurality of advertisement servers included in a first data center. The systems may also include a second plurality of advertisement servers included in a second data center. The systems may further include a performance data aggregator configured to receive performance data including one or more data values characterizing bidding activity associated with at least one online advertisement campaign, where the bidding activity characterizes bids placed by at least the first plurality of advertisement servers included in the first data center and the second plurality of advertisement servers included in the second data center. The systems may further include a spend control analyzer configured to generate a plurality of spend control data objects associated with a budget of the at least one online advertisement campaign, where the plurality of spend control data objects is generated based on an estimate of bidding activity associated with the first data center and bidding activity associated with the second data center, and each spend control data object of the plurality of spend control data objects is capable of configuring an advertisement server to perform one or more advertisement operations within one or more determined budgetary constraints. In various embodiments, the spend control analyzer is further configured to provide the plurality of spend control data objects to at least the first plurality of advertisement servers included in the first data center and the second plurality of advertisement servers included in the second data center.

In some embodiments, the estimate of bidding activity is generated based, at least in part, on the received performance data. In various embodiments, the estimate of bidding activity is based, at least in part, on a comparison of the received performance data and at least one portion of the budget identified by at least one previously generated spend control data object. In some embodiments, the estimate of bidding activity is further based on previous performance data including one or more data values characterizing previous bidding activity associated with the at least one online advertisement campaign. In various embodiments, the estimate of bidding activity is based, at least in part, on a weighted mean of the previous performance data and the received performance data. According to some embodiments, each spend control data object of the plurality of spend control data objects configures an advertisement server to spend an amount less than or equal to a portion of the budget represented by the spend control data object.

In some embodiments, the systems may further include a third plurality of advertisement servers included in a third data center. In various embodiments, the plurality of spend control data objects are generated based, at least in part, on bidding activity associated with the third data center. The systems may also include an additional performance data aggregator configured to receive performance data including one or more data values characterizing bidding activity associated with at least one online advertisement campaign in response to the performance data aggregator malfunctioning. The systems may further include an additional spend control analyzer configured to generate a plurality of spend control data objects associated with a budget of the at least one online advertisement campaign in response to the spend control analyzer malfunctioning. According to some embodiments, the systems may further include a data storage system configured to store and maintain historical data including previously generated performance data and spend control data objects, where the data storage system is configured to provide an offline backup in response to a loss of connectivity between the spend control analyzer and the first data center and second data center. In some embodiments, the first data center and the second data center are located in different geographical locations.

Also disclosed herein are devices that may include a performance data aggregator configured to receive performance data including one or more data values characterizing bidding activity associated with at least one online advertisement campaign, where the bidding activity characterizes bids placed by at least a first plurality of advertisement servers included in a first data center and a second plurality of advertisement servers included in a second data center. The devices may also include a spend control analyzer configured to generate a plurality of spend control data objects associated with a budget of the at least one online advertisement campaign, where the plurality of spend control data objects are generated based on the received performance data and an estimate of bidding activity associated with the first data center and bidding activity associated with the second data center, and where each spend control data object of the plurality of spend control data objects is capable of configuring an advertisement server to perform one or more advertisement operations within one or more determined budgetary constraints. In some embodiments, the spend control analyzer is further configured to provide the plurality of spend control data objects to at least the first plurality of advertisement servers included in the first data center and the second plurality of advertisement servers included in the second data center.

In some embodiments, the estimate of bidding activity is generated based, at least in part, on the received performance data. In various embodiments, the estimate of bidding activity is based, at least in part, on a comparison of the received performance data and at least one portion of the budget identified by at least one previously generated spend control data object. According to some embodiments, the estimate of bidding activity is further based on previous performance data including one or more data values characterizing previous bidding activity associated with the at least one online advertisement campaign. In various embodiments, the estimate of bidding activity is based, at least in part, on a weighted mean of the previous performance data and the received performance data. In some embodiments, each spend control data object of the plurality of spend control data objects configures an advertisement server to spend an amount less than or equal to a portion of the budget represented by the spend control data object.

Further disclosed herein are one or more non-transitory computer readable media having instructions stored thereon for performing a method, where the method includes receiving performance data including one or more data values characterizing bidding activity associated with at least one online advertisement campaign, where the bidding activity characterizes bids placed by at least a first plurality of advertisement servers included in a first data center and a second plurality of advertisement servers included in a second data center. The methods may also include generating a plurality of spend control data objects associated with a budget of the at least one online advertisement campaign, where the plurality of spend control data objects are generated based on the received performance data and an estimate of bidding activity associated with the first data center and bidding activity associated with the second data center, where each spend control data object of the plurality of spend control data objects is capable of configuring an advertisement server to perform one or more advertisement operations within one or more determined budgetary constraints. The methods may further include providing the plurality of spend control data objects to at least the first plurality of advertisement servers included in the first data center and the second plurality of advertisement servers included in the second data center, where each spend control data object of the plurality of spend control data objects configures an advertisement server to spend an amount less than or equal to a portion of the budget represented by the spend control data object.

In various embodiments, the estimate of bidding activity is generated based, at least in part, on the received performance data, and where the estimate of bidding activity is based, at least in part, on a comparison of the received performance data and at least one portion of the budget identified by at least one previously generated spend control data object. In various embodiments, the estimate of bidding activity is further based on previous performance data including one or more data values characterizing previous bidding activity associated with the at least one online advertisement campaign.

DETAILED DESCRIPTION

Figure 1:
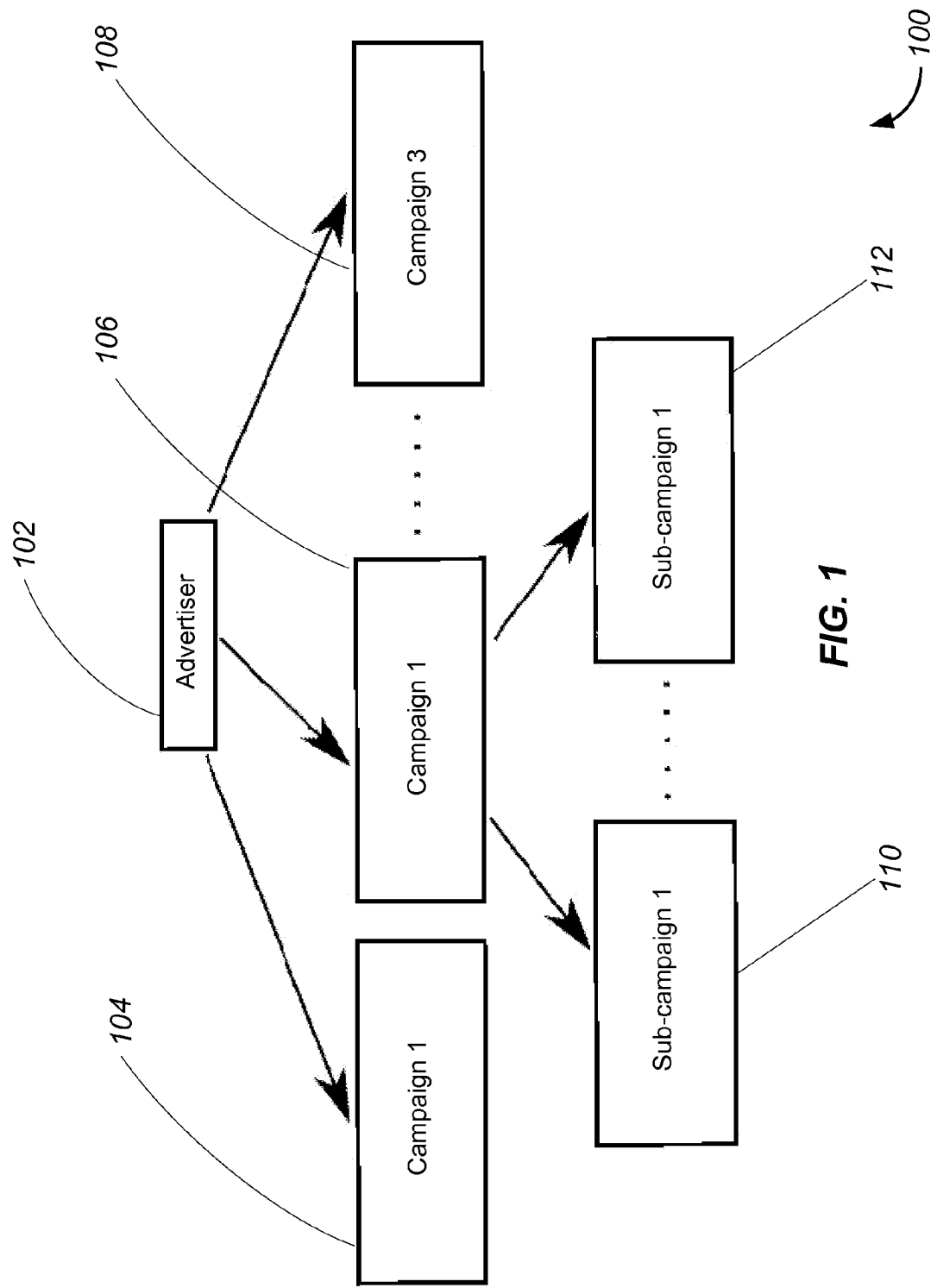
FIG. 1 illustrates an example of an advertiser hierarchy, implemented in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

In online advertising, advertisers often try to provide the best ad for a given user in an online context. Advertisers often set constraints which affect the applicability of the advertisements. For example, an advertiser might try to target only users in a particular geographical area or region who may be visiting web pages of particular types for a specific campaign. Thus, an advertiser may try to configure a campaign to target a particular group of end users, which may be referred to herein as an audience. As used herein, a campaign may be an advertisement strategy which may be implemented across one or more channels of communication. Furthermore, the objective of advertisers may be to receive as many user actions as possible by utilizing different campaigns in parallel. As previously discussed, an action may be the purchase of a product, filling out of a form, signing up for e-mails, and/or some other type of action. In some embodiments, actions or user actions may be advertiser-defined and may include an affirmative act performed by a user, such as inquiring about or purchasing a product and/or visiting a certain page.

In various embodiments, an ad from an advertiser may be shown to a user with respect to publisher content, which may be a website or mobile application if the value for the ad impression opportunity is high enough to win in a real-time auction. Advertisers may determine a value associated with an ad impression opportunity by determining a bid. In some embodiments, such a value or bid may be determined based on the probability of receiving an action from a user in a certain online context multiplied by the cost-per-action goal an advertiser wants to achieve. Once an advertiser, or one or more demand-side platforms that act on their behalf, wins the auction, it is responsible to pay the amount that is the winning bid.

Data objects and data events associated with advertisement campaign activity may be generated by various entities, such as servers and browsers, during the implementation of an advertisement campaign. Accordingly, such data may be performance data that may be indicative of a performance of one or more advertisement campaigns. For example, such data may be analyzed to determine various performance metrics, such as a return-on-investment, which may characterize or describe a return-on-investment provided by an advertisement campaign during a particular period of time. Because a system may have millions of associated users, the amount of performance data generated during a time period being analyzed may be very large. For example, in a single day, many terabytes of records and log files may be generated by a single advertisement campaign implemented by an advertiser. The performance data may include metadata, such as a timestamp, for each record in the raw logs. Based on the timestamp, performance data may be analyzed for a designated time or data range. For example, an advertiser may request performance metrics for an advertisement campaign's performance over the past thirty days. The performance data may include data objects and data events identifying a number of impressions, clicks, actions, revenue, and/or inventory cost for the advertisement campaign.

As will be discussed in greater detail below, online advertisement campaigns may be implemented, at least in part, by advertisement servers that may be configured to implement one or more advertisement operations, such as placing bids for impression opportunities and serving content upon winning a bid. Such advertisement servers may be included in data centers and may be distributed across many different geographical locations all over the world. Accordingly, an online advertisement campaign may be implemented across millions, possibly even billions, of users that reside in many different countries and time zones.

Conventional techniques for implementing online advertisement campaigns in such a distributed context remain limited because they are not able to effectively or efficiently implement a budget for the advertisement campaign in such a distributed context. For example, conventional advertisement servers are typically configured to automatically submit bids and perform advertisement operations unless instructed to stop. Thus, conventional advertisement servers may easily exceed their budget if they do not receive a stop signal or if they are not able to ascertain whether or not a limit of a budget has been reached. In a distributed context, the accurate transmission of a stop signal or accurate ascertaining of a budget may not be possible due to numerous different advertisement servers performing advertisement operations at the same time. In a distributed context in which millions or billions of users are targeted by an advertisement campaign, upwards of $100,000 may be spent within a single minute or less. Accordingly, in an amount of time taken by an advertisement server to query a central control server and receive instruction regarding budgetary limitations, other actions taken by other advertisement servers may have already depleted the budget or rendered the received instruction obsolete. Furthermore, conventional techniques do not provide fault tolerance to account for a loss of connectivity that may occur between an advertisement server and a central component, such as a control server. Accordingly, in the event of such a loss of connectivity, conventional techniques may continue spending and exceed the budget. Consequently, conventional techniques are not able to effectively implement a budget associated with an online advertisement campaign in a distributed context.

Various methods, systems, and devices are disclosed herein that provide spend control for the implementation of online advertisement campaigns. In various embodiments, advertisement servers included in data centers may be configured to not perform advertisement operations unless configured to do so by a spend control data object provided by a system component, such as a spend control analyzer. Accordingly, a spend control analyzer may be configured to analyze an overall budget associated with an online advertisement campaign, and may be further configured to analyze performance data associated with the advertisement servers that implement the advertisement campaign. The spend control analyzer may generate spend control data objects based on the analyses. The spend control data objects may configure the advertisement servers to perform advertisement operations within one or more determined budgetary constraints. For example, the advertisement servers may each be assigned a portion of a budget based on budgetary data associated with the advertisement campaign and performance data associated with the advertisement servers. In this way, the spend control analyzer may coordinate the advertisement operations of the different advertisement servers in a distributed context, and the budget of the advertisement campaign may be implemented effectively. Moreover, various systems, methods, and devices disclosed herein may be configured to provide fault tolerance as well. For example, if connectivity is lost between an advertisement server and the spend control analyzer, the advertisement server may exhaust its allocated portion of the budget and stop performing any additional advertisement operations. The spend control analyzer may identify the loss of connectivity and store the budget that would have been consumed by the advertisement server, or allocate the budget to another advertisement server.

FIG. 1 illustrates an example of an advertiser hierarchy 100, implemented in accordance with some embodiments. As previously discussed, advertisement servers may be used to implement various advertisement campaigns to target various users or an audience. In the context of online advertising, an advertiser, such as the advertiser 102, may display or provide an advertisement to a user via a publisher, which may be a web site, a mobile application, or other browser or application capable of displaying online advertisements. The advertiser 102 may attempt to achieve the highest number of user actions for a particular amount of money spent, thus maximizing the return on the amount of money spent. Accordingly, the advertiser 102 may create various different tactics or strategies to target different users. Such different tactics and/or strategies may be implemented as different advertisement campaigns, such as campaign 104, campaign 106, and campaign 108, and/or may be implemented within the same campaign. Each of the campaigns and their associated sub-campaigns may have different targeting rules which may be referred to herein as an audience segment. For example, a sports goods company may decide to set up a campaign, such as campaign 104, to show golf equipment advertisements to users above a certain age or income, while the advertiser may establish another campaign, such as campaign 106, to provide sneaker advertisements towards a wider audience having no age or income restrictions. Thus, advertisers may have different campaigns for different types of products. The campaigns may also be referred to herein as insertion orders.

Each campaign may include multiple different sub-campaigns to implement different targeting strategies within a single advertisement campaign. In some embodiments, the use of different targeting strategies within a campaign may establish a hierarchy within an advertisement campaign. Thus, each campaign may include sub-campaigns which may be for the same product, but may include different targeting criteria and/or may use different communications or media channels. Some examples of channels may be different social networks, streaming video providers, mobile applications, and web sites. For example, the sub-campaign 110 may include one or more targeting rules that configure or direct the sub-campaign 110 towards an age group of 18-34 year old males that use a particular social media network, while the sub-campaign 112 may include one or more targeting rules that configure or direct the sub-campaign 112 towards female users of a particular mobile application. As similarly stated above, the sub-campaigns may also be referred to herein as line items.

Accordingly, an advertiser 102 may have multiple different advertisement campaigns associated with different products. Each of the campaigns may include multiple sub-campaigns or line items that may each have different targeting criteria. Moreover, each campaign may have an associated budget which is distributed amongst the sub-campaigns included within the campaign to provide users or targets with the advertising content.

Figure 2:
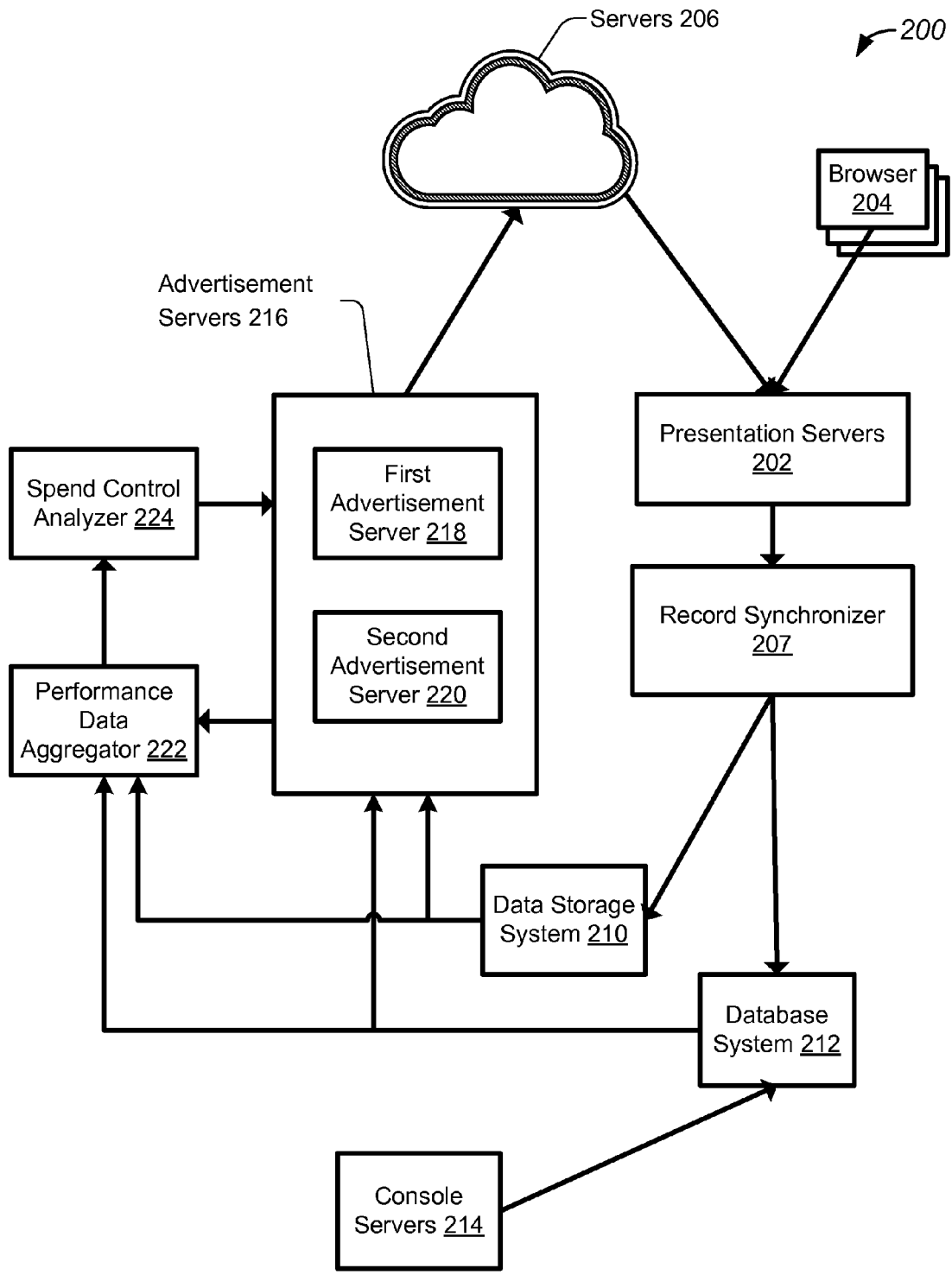
FIG. 2 illustrates a diagram of an example of a system for controlling spending associated with an advertisement campaign, implemented in accordance with some embodiments.

FIG. 2 illustrates a diagram of an example of a system for controlling spending associated with an advertisement campaign, implemented in accordance with some embodiments. As similarly discussed above, in the context of online advertising, millions of users may be presented with advertisement content managed by advertisement campaigns that may be implemented via many channels of communication. Moreover, the millions of users may be located in numerous different geographical regions served by numerous different advertisement servers in different data centers. Accordingly, one or more components of system 200 may be implemented to ensure that a budget for an advertisement campaign is implemented efficiently and effectively without substantial overspending.

In various embodiments, system 200 may include one or more presentation servers, such as presentation servers 202. According to some embodiments, presentation servers 202 may be configured to aggregate various online advertising data from several data sources. The online advertising data may include live internet data traffic that may be associated with users, as well as variety of supporting tasks. For example, the online advertising data may include one or more data values identifying various impressions, clicks, data collection events, and/or beacon fires that may characterize interactions between users and one or more advertisement campaigns. As discussed herein, such data may also be described as performance data that may form the underlying basis of analyzing a performance of one or more advertisement campaigns. In some embodiments, presentation servers 202 may be front-end servers that may be configured to process a large number of real-Internet users, and associated SSL (Secure Socket Layer) handling. The front-end servers may be configured to generate and receive messages to communicate with other servers in system 200. In some embodiments, the front-end servers may be configured to perform logging of events that are periodically collected and sent to additional components of system 200 for further processing.

As similarly discussed above, presentation servers 202 may be communicatively coupled to one or more data sources such as browser 204 and servers 206. In some embodiments, browser 204 may be an Internet browser that may be running on a client machine associated with a user. Browser 204 may also be in the form of an app that is configured on a mobile device. In general, a user may use browser 204 to access the Internet and receive advertisement content via browser 204. Accordingly, various clicks and other actions may be performed by the user via browser 204. Moreover, browser 204 may be configured to generate various online advertising data described above. For example, various cookies, advertisement identifiers, beacon fires, and user identifiers may be identified by browser 204 based on one or more user actions, and may be transmitted to presentation servers 202 for further processing. As discussed above, various additional data sources may also be communicatively coupled with presentation servers 202 and may also be configured to transmit similar identifiers and online advertising data based on the implementation of one or more advertisement campaigns by various advertisement servers, such as advertisement servers 216 discussed in greater detail below. For example, the additional data servers may include servers 206 which may process bid requests and generate one or more data events associated with providing online advertisement content based on the bid requests. Thus, servers 206 may be configured to generate data events characterizing the processing of bid requests and implementation of an advertisement campaign. Such bid requests may be transmitted to presentation servers 202. As will be discussed in greater detail below, data events may also refer to or characterize activities performed by other entities, such as the advertisement servers themselves.

In various embodiments, system 200 may further include record synchronizer 207 which may be configured to receive one or more records from various data sources that characterize the user actions and data events described above. In some embodiments, the records may be log files that include one or more data values characterizing the substance of the user action or data event, such as a click or conversion. The data values may also characterize metadata associated with the user action or data event, such as a timestamp identifying when the user action or data event took place. According to various embodiments, record synchronizer 207 may be further configured to transfer the received records, which may be log files, from various end points, such as presentation servers 202, browser 204, and servers 206 described above, to a data storage system, such as data storage system 210 described in greater detail below. Accordingly, record synchronizer 207 may be configured to handle the transfer of log files from various end points located at different locations throughout the world to data storage system 210 as well as other components of system 200, such as performance data aggregator 222 discussed in greater detail below. In some embodiments, record synchronizer 207 may be configured and implemented as a MapReduce system that is configured to implement a MapReduce job to directly communicate with a communications port of each respective endpoint and periodically download new log files.

As discussed above, system 200 may further include advertisement servers 216 which may be configured to implement one or more advertisement operations. For example, advertisement servers 216 may be configured to store budget data associated with one or more advertisement campaigns, and may be further configured to implement the one or more advertisement campaigns over a designated period of time. In some embodiments, the implementation of the advertisement campaign may include identifying actions or communications channels associated with users targeted by advertisement campaigns, placing bids for impression opportunities, and serving content upon winning a bid. In some embodiments, the content may be advertisement content, such as an Internet advertisement banner, which may be associated with a particular advertisement campaign. The terms "advertisement server" and "advertiser" are used herein generally to describe systems that may include a diverse and complex arrangement of systems and servers that work together to display an advertisement to a user's device. For instance, this system will generally include a plurality of servers and processing nodes for performing different tasks, such as bid management, bid exchange, advertisement and campaign creation, content publication, etc. Accordingly, advertisement servers 216 may be configured to generate one or more bid requests based on various advertisement campaign criteria. As discussed above, such bid requests may be transmitted to servers 206.

In various embodiments, advertisement servers 216 may include several advertisement servers, such as first advertisement server 218 and second advertisement server 220, which may be included in a data center. As will be discussed in greater detail below with reference to FIG. 3, a data center may include one or more structures configured to house or retain various components used to implement advertisement campaigns. Accordingly, a data center may include advertisement servers 216 and may optionally include other components such as presentation servers 202, record synchronizer 207, data storage system 210, and/or database system 212. Various different data centers may be implemented in different geographical locations to implement an advertisement campaign across different geographical regions.

In some embodiments, system 200 may include performance data aggregator 222 which may be configured to receive and aggregate performance data from various different data sources. For example, performance data aggregator 222 may receive data from first advertisement server 218 and second advertisement server 220. Performance data aggregator 222 may also be configured to receive data from data storage system 210 and database system 212. Accordingly, performance data aggregator 222 may be configured to receive performance data and populate a data store used to store and maintain the performance data. As will be discussed in greater detail below, performance data aggregator 222 may be configured to periodically query or poll various advertisement servers to incrementally retrieve performance data characterizing recent activity associated with the advertisement servers, such as a number of bids placed and an amount of money spent.

System 200 may further include spend control analyzer 224 which may be configured to analyze the received performance data, and may be further configured to generate spend control data objects which may be configured to distribute or apportion a budget associated with a campaign over various different advertisement servers which may be implemented in different data centers. Thus, spend control analyzer 224 may be communicatively coupled to performance data aggregator 222 and may be configured to receive performance data from performance data aggregator 222. Moreover, spend control analyzer 224 may be communicatively coupled with advertisement servers 216. As will be discussed in greater detail below, spend control analyzer 224 may be configured to transmit or provide spend control data objects to advertisement servers 216, thus, configuring the operation of advertisement servers 216 to ensure that a budget for an advertisement campaign implemented by advertisement servers 216 is effectively managed.

In various embodiments, system 200 may include data storage system 210. In some embodiments, data storage system 210 may be implemented as a distributed file system. As similarly discussed above, in the context of processing online advertising data from the above described data sources, there may be many terabytes of log files generated every day. Accordingly, data storage system 210 may be implemented as a distributed file system configured to process such large amounts of data. In one example, data storage system 210 may be implemented as a Hadoop® Distributed File System (HDFS) that includes several Hadoop® clusters specifically configured for processing and computation of the received log files. For example, data storage system 210 may include two Hadoop® clusters where a first cluster is a primary cluster including one primary namenode, one standby namenode, one secondary namenode, one Jobtracker, and one standby Jobtracker. The secondary namenode may be utilized for recovery, backup, and time-costing query. In some embodiments, data storage system 210 may be implemented within the context of geographically distributed data centers having about 100% fail-over redundancy, and about 99.99% uptime. Accordingly, data storage system 210 may be implemented in one or more data centers utilizing multiple redundancy and failover techniques.

In various embodiments, system 200 may also include database system 212 which may be configured to store data generated by performance data analyzer 216, discussed in greater detail below. In some embodiments, database system 212 may be implemented as one or more clusters having one or more nodes. For example, database system 212 may be implemented as a four-node RAC (Real Application Cluster). Two nodes may be configured to process system metadata, and two nodes may be configured to process various online advertisement data, which may be performance data, that may be utilized by performance data analyzer 216. In various embodiments, database system 212 may be implemented as a scalable database system which may be scaled up to accommodate the large quantities of online advertising data handled by system 200. Additional instances may be generated and added to database system 212 by making configuration changes, but no additional code changes.

In various embodiments, database system 212 may be communicatively coupled to console servers 214 which may be configured to execute one or more front-end applications. For example, console servers 214 may be configured to provide application program interface (API) based configuration of advertisements and various other advertisement campaign data objects. Accordingly, an advertiser may interact with and modify one or more advertisement campaign data objects via the console servers. In this way, specific configurations of advertisement campaigns may be received via console servers 214, stored in database system 212, and accessed by advertisement servers 216 which may also be communicatively coupled to database system 212. Moreover, console servers 214 may be configured to receive requests for analyses of performance data, and may be further configured to generate one or more messages that transmit such requests to other components of system 200.

Figure 3:
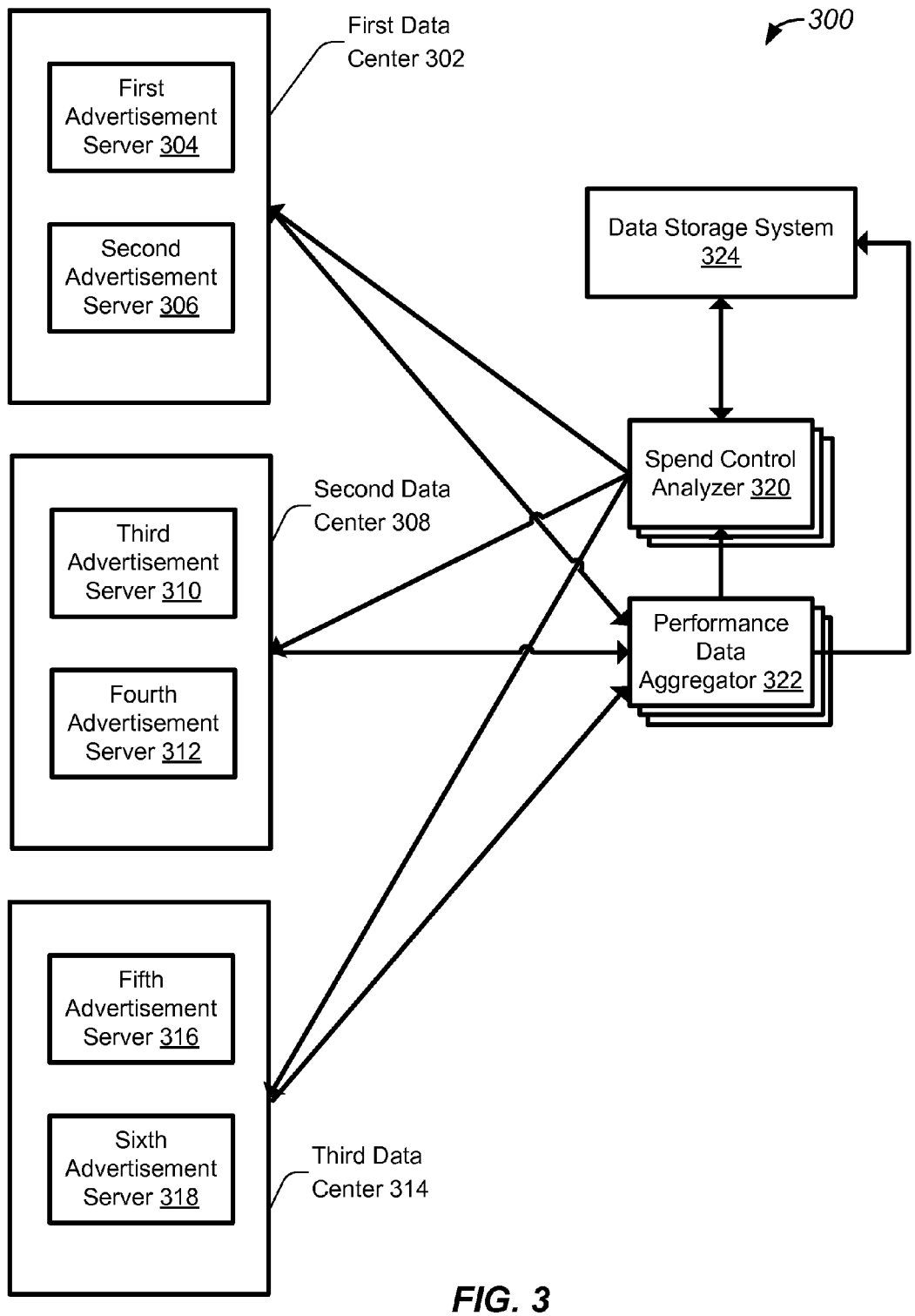
FIG. 3 illustrates a diagram of an example of another system for controlling spending associated with an advertisement campaign, implemented in accordance with some embodiments.

FIG. 3 illustrates a diagram of an example of another system for controlling spending associated with an advertisement campaign, implemented in accordance with some embodiments. As similarly discussed above, data centers may include advertisement servers used to implement online advertisement campaigns. As will be discussed in greater detail below, different data centers may be implemented in different geographical regions across the world. Accordingly, one or more components of a system, such as system 300, may be implemented to distribute or apportion a budget for the online advertisement campaign across all of the advertisement servers in the different data centers such that the budget is implemented effectively and efficiently across all advertisement servers in their respective different data centers and geographical locations.

System 300 may include several data centers, such as first data center 302, second data center 308, and third data center 314. As similarly discussed above, a data center may include system components configured to implement components of an advertisement campaign. For example, first data center 302 may include several advertisement servers, such as first advertisement server 304 and second advertisement server 306. Similarly, second data center 308 may include third advertisement server 310 and fourth advertisement server 312. Furthermore, third data center 314 may include fifth advertisement server 316 and sixth advertisement server 318. As similarly discussed above, according to various embodiments, the different advertisement servers included in different data centers may collectively be used to implement an online advertisement campaign. Thus, as will be discussed in greater detail below, one or more system components, such as spend control analyzer 320, may be configured to apportion a single budget associated with the online advertisement campaign across the different advertisement servers and data centers.

In various embodiments, different data centers may be implemented or utilized for different geographical locations. For example, first data center 302 may be implemented in a first geographical region, such as North America. Second data center 308 may be implemented in a second geographical region, such as Europe. Moreover, third data center 314 may be implemented in a third geographical region, such as Hong Kong. Accordingly, the different data centers may be implemented in entirely different regions of the world serving millions of different users across many different time zones.

System 300 may further include performance data aggregator 322 which may be configured to aggregate performance data associated with the different data centers and their respective advertisement servers. Accordingly, performance data aggregator 322 may be communicatively coupled to first data center 302, second data center 308, and third data center 314. Moreover, performance data aggregator 322 may be configured to periodically retrieve data from each of the different data centers in their respective different locations, and may retrieve performance data from first data center 302, second data center 308, and third data center 314 after the passing of a designated period of time. For example, performance data aggregator 322 may retrieve performance data every minute, every five minutes, or every half hour. In various embodiments, the designated period of time may be dynamically configurable and may be determined based on one or more system constraints, such as an amount of network traffic associated with a particular data center, and a processing load experienced by performance data aggregator 322.

As discussed above, system 300 may also include spend control analyzer 320 which may be configured to apportion a single budget associated with the online advertisement campaign across the different advertisement servers and data centers. Accordingly, spend control analyzer 320 may be communicatively coupled to performance data aggregator 322 and may receive aggregated performance data from performance data aggregator 322. Moreover, spend control analyzer 320 may be communicatively coupled to first data center 302, second data center 308, and third data center 314 and/or their respective advertisement servers. Thus, as will be discussed in greater detail below, spend control analyzer 320 may be configured to analyze performance data associated with the different advertisement servers, and may be configured to generate spend control data objects that configure the advertisement servers to spend at most a specified portion of the budget. In this way, the spend control analyzer may coordinate the implementation of a budget for an online advertisement campaign across multiple different advertisement servers in multiple different data centers located in many different geographical locations.

In various embodiments, performance data aggregator 322 and spend control analyzer 320 may include one or more processing devices configured to aggregate and process performance data associated with advertisement campaigns. In some embodiments, performance data aggregator 322 may include one or more communications interfaces configured to communicatively couple performance data aggregator 322 to other components and entities, such various different data centers and advertisement servers. Furthermore, as similarly stated above, performance data aggregator 322 and spend control analyzer 320 may include one or more processing devices specifically configured to process performance data associated with data events and advertisement campaigns. In one example, spend control analyzer 320 includes at least one query node and a plurality of big data processing nodes for processing large amounts of performance data in a distributed manner. For example, spend control analyzer 320 may include one or more query nodes to handle queries associated with a data storage system, such as data storage system 324. Moreover, spend control analyzer 320 may further include several processing nodes, configured to handle processing operations on large data sets. Any suitable number of nodes may be included in spend control analyzer 320. Accordingly, spend control analyzer 320 may include one or more processing nodes such as a first processing node, a second processing node, a third processing node, a fourth processing node, a fifth processing node, and/or a sixth processing node. In one example, performance data aggregator 322 may also include big data processing nodes for processing large amounts of performance data in a distributed manner. In one specific embodiment, spend control analyzer 320 may include one or more application specific processors implemented in application specific integrated circuits (ASICs) that may be specifically configured to process large amounts of data in complex data sets, as may be found in the context referred to as "big data."

In some embodiments, the one or more processors may be implemented in one or more reprogrammable logic devices, such as a field-programmable gate array (FPGAs), which may also be similarly configured. According to various embodiments, spend control analyzer 320 may include one or more dedicated processing units that include one or more hardware accelerators configured to perform pipelined data processing operations. For example, operations associated with the generation of spend control data objects may be processed, at least in part, by one or more hardware accelerators included in spend control analyzer 320.

In various embodiments, such large data processing contexts may involve performance data stored across multiple servers implementing one or more redundancy mechanisms configured to provide fault tolerance for the performance data. In some embodiments, a MapReduce-based framework or model may be implemented to analyze and process the large data sets disclosed herein. Furthermore, various embodiments disclosed herein may also utilize other frameworks, such as .NET or grid computing.

In some embodiments, system 300 may include data storage system 324 which may be configured to store historical data characterizing previously received performance data. Accordingly, data storage system 324 may be communicatively coupled to performance data aggregator 322 and may store data aggregated by performance data aggregator 322. In various embodiments, the data stored in data storage system 324 may provide a backup or offline source of data which may enable spend control analyzer 320 to continue generating spend control data objects even if spend control analyzer 320 loses connectivity with performance data aggregator 322. In this way, data storage system 324 may be configured to provide fault tolerance for system 300 and an advertisement campaign implemented by system 300.

Figure 4:
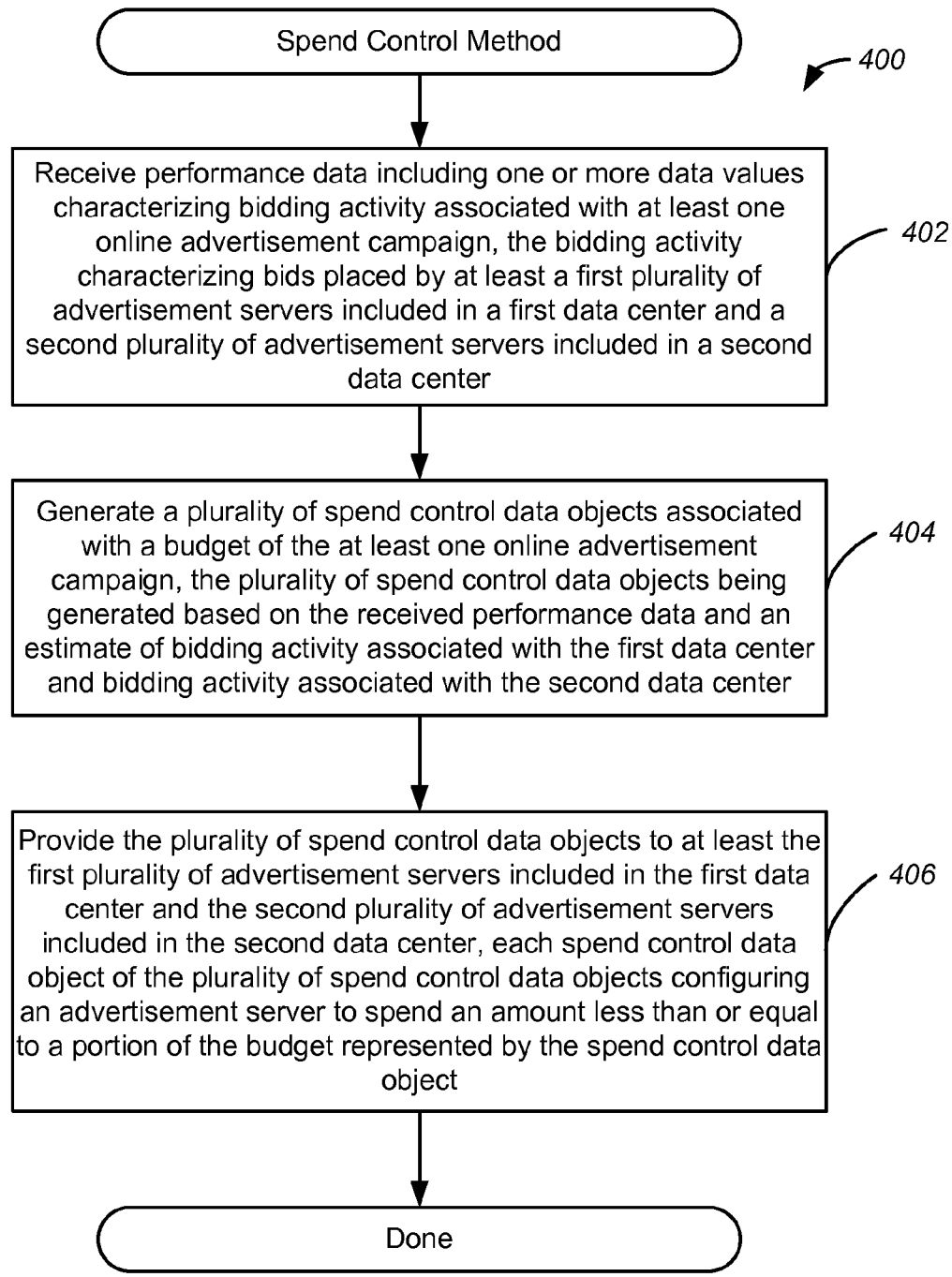
FIG. 4 illustrates a flow chart of an example of a spend control method, implemented in accordance with some embodiments.

FIG. 4 illustrates a flow chart of an example of a spend control method, implemented in accordance with some embodiments. In various embodiments, a spend control method, such as method 400, may be implemented to manage and implement a budget for an advertisement campaign in a distributed context in which several different groups of advertisement servers are implemented in different data centers distributed across different geographical locations. Moreover, method 400 may be implemented to provide fault tolerance for the management and implementation of the budget.

Accordingly, method 400 may commence with operation 402 during which performance data may be received. As similarly discussed above, the performance data may include one or more data values characterizing bidding activity associated with at least one online advertisement campaign. In various embodiments, the bidding activity may characterize bids placed by at least a first plurality of advertisement servers included in a first data center and a second plurality of advertisement servers included in a second data center. Accordingly, the performance data may be aggregated from many different advertisement servers implemented in different data centers distributed across the world to implement the online advertisement campaign.

Method 400 may proceed to operation 404 during which a plurality of spend control data objects may be generated. In various embodiments, the spend control data objects may be associated with a budget of the at least one online advertisement campaign. For example, the spend control data objects may collectively represent a budget or an amount of a budget that may be spent for that particular online advertisement campaign over a designated period of time. Moreover, the spend control data objects may be generated based on the received performance data and an estimate of bidding activity associated with the first data center and bidding activity associated with the second data center. Accordingly, as will be discussed in greater detail below, the spend control data objects may be generated based on online advertisement operations performed by advertisement servers included in the first data center as well as by advertisement servers included in the second data center.

Method 400 may proceed to operation 406 during which the plurality of spend control data objects may be provided to at least the first plurality of advertisement servers included in the first data center and the second plurality of advertisement servers included in the second data center. In various embodiments, each spend control data object may configure an advertisement server to spend an amount less than or equal to a portion of the budget represented by the spend control data object. Accordingly, each spend control data object may configure an advertisement server to continue implementing one or more online advertisement operations within a set of budgetary constraints representing or characterizing a portion of an overall budget of the advertisement campaign identified by the spend control data object.

Figure 5:
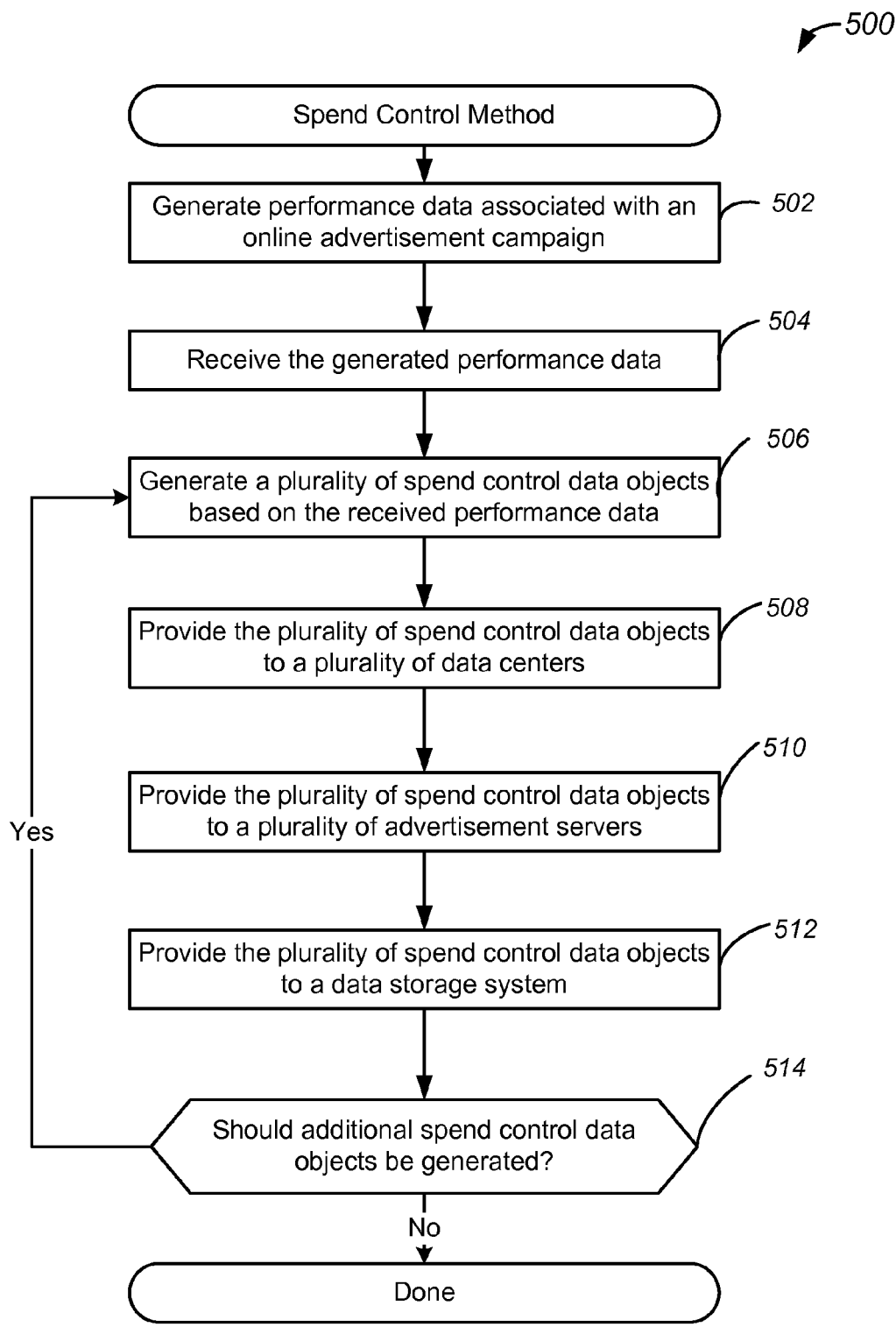
FIG. 5 illustrates a flow chart of an example of another spend control method, implemented in accordance with some embodiments.

FIG. 5 illustrates a flow chart of an example of another spend control method, implemented in accordance with some embodiments. A spend control method, such as method 500, may be implemented to apportion or allocate a budget for an online advertisement campaign across multiple advertisement servers implemented in multiple different data centers. Accordingly, method 500 may be implemented to effectively and efficiently manage the distribution of a budget across different advertisement servers in different data centers such that the online advertisement campaign complies with its budget even when implemented in a distributed context, and even if connectivity is lost between a system component, such as a spend control analyzer, and one or more advertisement servers and/or one or more data centers.

Accordingly, method 500 may commence with operation 502 during which performance data associated with an online advertisement campaign may be generated. As similarly discussed above, the performance data may be generated by an advertisement server based on one or more advertisement operations performed by the advertisement server, such as the submissions of bids to serve advertisement content. Thus the performance data may include one or more data values identifying various data events, such as bid submissions, and costs or an amount spent associated with each data event. In various embodiments, an advertisement server may be configured such that the advertisement operations may be part of the online advertisement campaign and may be constrained by a spend control data object that may have been previously received by the advertisement server, as will be discussed in greater detail below. As previously discussed, the performance data may be generated by various different advertisement servers distributed across different data centers in different locations and time zones across the world.

Method 500 may proceed to operation 504 during which the generated performance data may be received by a component of a spend control system. Accordingly, the generated performance data may be received at a system component which may be a performance data aggregator. In some embodiments, the performance data aggregator may be communicatively coupled to the different advertisement servers in different data centers associated with the performance data. The performance data aggregator may query the advertisement servers, or may periodically receive performance data from the advertisement servers. For example, performance data may be transmitted from the advertisement servers to the performance data aggregator every minute. In this way the performance data aggregator may aggregate the performance data from the advertisement servers to collect all performance data associated with the online advertisement campaign. In various embodiments, the performance data may be aggregated for a particular time period. Thus, the performance data may be aggregated incrementally.

In some embodiments, the performance data aggregator may be configured to generate aggregate data objects that represent or characterize the aggregated performance data associated with a particular advertisement campaign during a particular time period. The generation of the aggregate data objects may include mapping received data events to a particular data object based on an identifier included in the data event. In some embodiments, the identifier may include one or more data values that identify an advertisement campaign associated with the data event. Thus, performance data may be filtered based on the advertisement campaign identifiers to identify only data events and performance data for that particular advertisement campaign. The generation of aggregate data objects may further include translating or converting temporal metadata associated with the performance data and data events identified by the performance data such that performance data received from the various different advertisement servers across the world is translated to a same temporal reference point or time zone. In various embodiments, the aggregate data objects may be generated incrementally such that each aggregate data object represents additional performance data received between a previous iteration of method 500 and a current iteration of method 500.

Method 500 may proceed to operation 506 during which a plurality of spend control data objects may be generated based on the received performance data. In various embodiments, a spend control data object may be a data object including one or more data values capable of configuring an advertisement server to perform one or more advertisement operations associated with a particular advertisement campaign. In some embodiments, the configuring of the advertisement server may impose one or more constraints or conditions upon the advertisement operations performed by the advertisement server. For example, a spend control data object may include one or more data values identifying a particular amount of money that represents a portion of an overall budget for an advertisement campaign. Accordingly, the spend control data object may configure the advertisement server to spend no more than the designated or defined amount identified by the one or more data values. According to some embodiments, the spend control data may include a representation of an expected deviation from historical spend data to adjust for dynamic bidding behavior in the advertisement server. This expected deviation may be adjusted based on other information such as data center, time of day, campaign type etc.

In various embodiments, the spend control data objects may be generated by a system component, such as a spend control analyzer. The spend control analyzer may be configured to generate the spend control data objects based on the received performance data. Accordingly, based on the performance data received from all of the advertisement servers used to implement the advertisement campaign, the spend control analyzer may determine how to apportion an overall budget of an advertisement campaign for a particular period or duration of time. As will be discussed in greater detail below with reference to FIG. 6, the spend control analyzer may analyze performance data associated with each advertisement server to determine how much money has been spent by each advertisement server, and whether more or less money should be allocated to each advertisement server. For example, advertisement servers that have spent more money due to frequent bidding activity may be allocated more of the budget, while advertisement servers that have spent less money due to infrequent bidding activity may be allocated less of the budget. In this way, the spend control analyzer may determine a size of a portion of a budget for a particular period of time that should be allocated to each advertisement server used to implement the advertisement campaign. The spend control analyzer may include the determined size as one or more data values in a spend control data object which may subsequently be sent to its associated advertisement server.

In some embodiments, as will be discussed in greater detail below with reference to FIG. 6, the generation of the spend control data objects may be based on a non-linear analysis of received performance data. In various embodiments, performance data associated with a previous two, three, or more iterations of method 500 may be analyzed, and performance data associated with different iterations may be weighted differently. For example, performance data generated during a particular time of day that experiences high volumes of online advertising traffic may be weighted higher or greater than performance data generated during a different time of day that experiences low volumes of online advertising traffic. Moreover, more recent performance data may be weighted greater. For example, one or more smoothing techniques may be implemented in which performance data generated during a particular time period, such as a business day, may be aggregated into two data sets, and a weighted mean may be determined based on the two data sets. The first data set may represent performance data generated during a first time period extending from the beginning of the business day to a beginning of a current time period or interval associated with method 500, which may be about 15 minutes, as discussed in greater detail below with reference to operation 514. The second data set may represent performance data generated during the current time period or interval. As will be discussed in greater detail below with reference to FIG. 6, performance data underlying the determination of a spend control data object may be determined based on a weighted mean of the two data sets.

Method 500 may proceed to operation 508 during which the plurality of spend control data objects may be provided to a plurality of data centers. Accordingly, the spend control data objects may be sent to each data center and may be implemented by a local system component. For example, each data center may have its own control server which may be configured to manage communications between the advertisement servers implemented in that data center and other components or entities that are external to that data center. Thus, according to some embodiments, local control servers may be configured to handle the distribution and implementation of the spend control data objects in response to receiving them from a system component, such as a spend control analyzer. In various embodiments, operation 508 may be optionally performed. Thus, according to some embodiments, the advertisement servers may be directly communicatively coupled to the spend control analyzer and the spend control data objects may be provided directly to the advertisement servers and implemented as discussed in greater detail below.

Method 500 may proceed to operation 510 during which the plurality of spend control data objects may be provided to the advertisement servers. Accordingly, the spend control data objects may be provided to each of the advertisement servers used to implement the online advertisement campaign. As discussed above, the spend control data objects may be received from a control server implemented in a data center, or may be received directly from a spend control analyzer. In response to receiving the spend control data objects, the advertisement servers may configure themselves to perform one or more advertisement operations constrained or defined by the received spend control data objects. In various embodiments, the advertisement servers may be implemented within several different data centers having different geographical locations. Accordingly, the spend control data objects may be implemented concurrently across the several different data centers to implement an additional portion of the budget for the online advertisement campaign in a distributed context that spans numerous different geographical locations across the world.

Method 500 may proceed to operation 512 during which the plurality of spend control data objects may be provided to a data storage system. In various embodiments, the data storage system may be configured to store historical data associated with the implementation of the advertisement campaign. For example, the data storage system may store previously received performance data as well as previously generated spend control data objects associated with the performance data. In this way, the data storage system may be configured to retain a historical record of the implementation of the online advertisement campaign. As will be discussed in greater detail below with reference to FIG. 7, such a historical record may be used by a system component, such as a spend control analyzer, to generate additional performance data objects in response to a loss of connectivity with the advertisement servers.

Method 500 may proceed to operation 514 during which it may be determined whether or not additional spend control data objects should be generated. In various embodiments, such a determination may be made based on one or more designated parameters. For example, a designated parameter may identify a particular duration of time that may have been specified or identified by a user or system administrator. In this example, the duration of time may be determined based on processing resources available in the spend control system as well as an amount of network traffic that the system is capable of handling. In one example, if the system has a low amount of processing resources and can handle a low amount of network traffic, the duration of time may be relatively large to reduce the amount of processing overhead incurred by method 500. Moreover, if the system has a high amount of processing resources and may handle a high amount of network traffic, the duration of time may be relatively small to enable faster and more current generation of spend control data objects. In one example, the duration of time may be about 15 minutes. In this example, if 15 minutes has elapsed since the last iteration of method 500, a system component, such as a spend control analyzer, may determine that additional spend control data objects should be generated. In various embodiments, the duration of time may be dynamically configurable based on current available processing resources, traffic constraints, and traffic patterns.

Accordingly, the determination of whether or not additional spend control data objects should be generated may be determined based on whether or not a duration of time identified by a designated parameter has elapsed. If it is determined that additional spend control data objects should be generated, method 500 may return to operation 502, and method 500 may repeat. If it is determined that no additional spend control data objects should be generated, method 500 may terminate.

Figure 6:
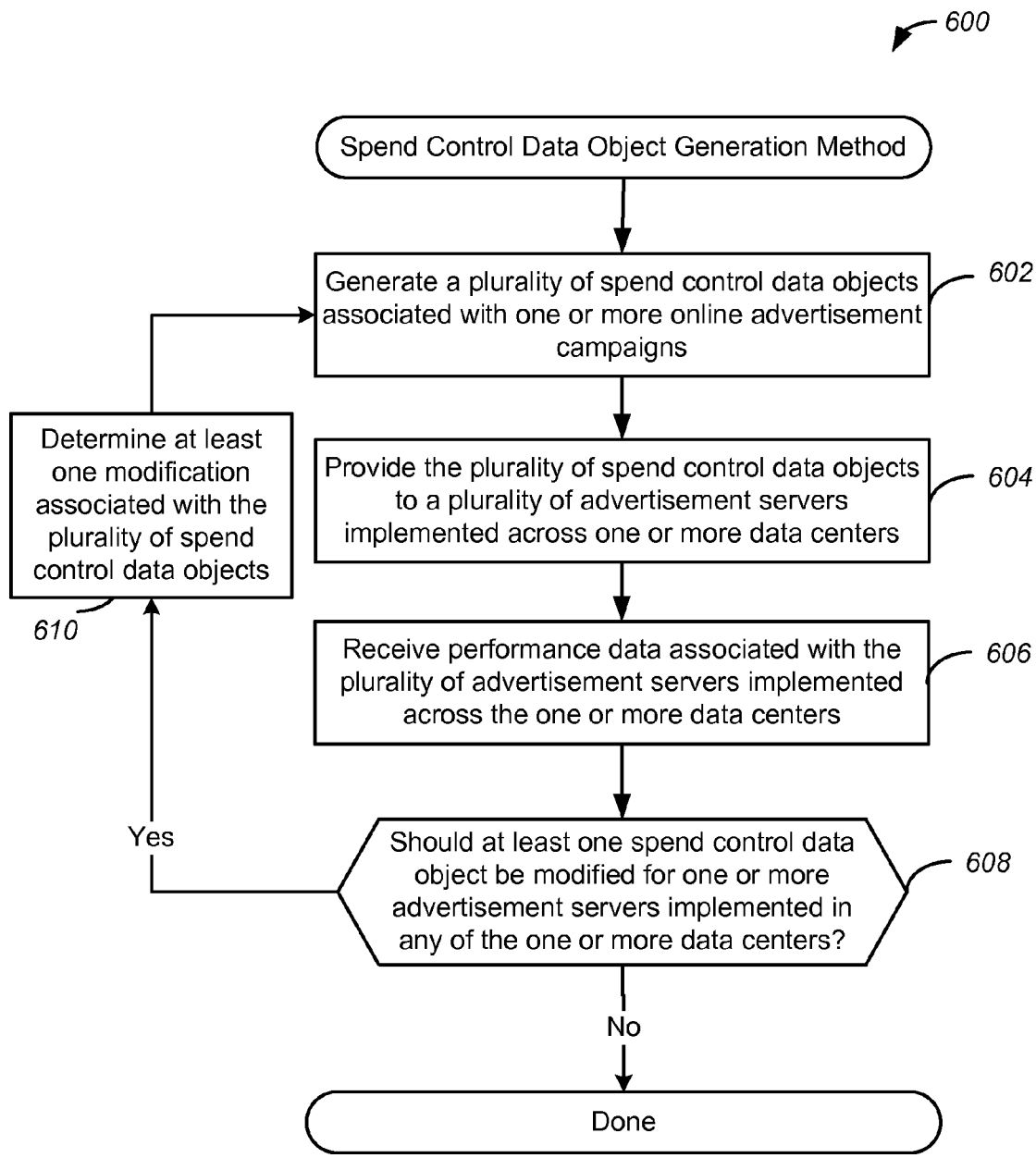
FIG. 6 illustrates a flow chart of an example of a spend control data object generation method, implemented in accordance with some embodiments.

FIG. 6 illustrates a flow chart of an example of a spend control data object generation method, implemented in accordance with some embodiments. As similarly discussed above, method 600 may be implemented to apportion a budget across several different advertisement servers located in several different data centers. Moreover, method 600 may be implemented to apportion the budget based on performance characteristics of the advertisement servers such that the budget is implemented efficiently and effectively, and may be implemented even if connectivity with one or more of the advertisement servers is lost.

Accordingly, method 600 may commence with operation 602 during which a plurality of spend control data objects may be generated for one or more online advertisement campaigns. As similarly discussed above, a spend control data object may be a data object including one or more data values capable of configuring an advertisement server to perform one or more advertisement operations associated with a particular advertisement campaign. In various embodiments the spend control data object may be generated based on previously received performance data or historical data identifying a previous performance of the advertisement servers. For example, if previous performance or historical data indicates that an advertisement server spent ten percent of an overall budget for a particular time period, the spend control analyzer may allocate the same amount of the budget to the advertisement server for the next time period. As will be discussed in greater detail below, the amount may also be varied or modified based on an analysis of the previously generated data. If no performance or historical data is available, a system component, such as the spend control analyzer, may be configured to generate the plurality of spend control data objects such that each one has a designated value. For example, the designated value may be a default value in which the budget is evenly divided across all advertisement servers.

Method 600 may proceed to operation 604 during which the plurality of spend control data objects may be provided to a plurality of advertisement servers implemented across one or more data centers. As similarly discussed above, a system component, such as a spend control analyzer, may provide the spend control data objects to the advertisement servers via a data center component, or directly to the advertisement servers themselves. In response to receiving the spend control data objects, the advertisement servers may configure themselves to perform one or more advertisement operations constrained or defined, at least in part, by the spend control data objects.

Method 600 may proceed to operation 606 during which performance data associated with the plurality of advertisement servers implemented across the one or more data centers may be received. Thus, for a particular period of time, the advertisement servers may perform one or more advertisement operations, and may generate performance data, which may be aggregated and received by a system component, such as a performance data aggregator.

Method 600 may proceed to operation 608 during which it may be determined whether or not at least one spend control data object should be modified. In various embodiments, a system component, such as the spend control analyzer, may determine whether or not the spend control data objects should be modified based on an analysis of the received performance data. For example, as will be discussed in greater detail below with reference to operation 610, the spend control analyzer may shift or reallocate portions of the budget for the online advertisement campaign among different advertisement servers based on the performance of each of the advertisement servers. In this way, the budget may be dynamically allocated based on which advertisement servers are more active and which advertisement servers are less active. If it is determined that at least one spend control data object should be modified, method 600 may proceed to operation 610.

Accordingly, method 600 may proceed to operation 610 during which at least one modification associated with the spend control data objects may be determined. As similarly discussed above, a spend control analyzer may determine whether or not the spend control data objects should be modified based on an analysis of the received performance data. In some embodiments, the analysis may include a comparison of the received performance data with a portion of a budget that was previously assigned to a particular advertisement server. For example, an amount of a budget may have been allocated to an advertisement server for a particular period of time during operation 602, and the amount allocated may be compared with an amount actually spent by the advertisement server during that period of time, which may be identified by the performance data received during operation 606. In some embodiments, a size of a portion of a budget initially allocated to an advertisement server may be based on an estimate of activity or a default value. The initial default value may be obtained by assuming an even spend through the day. In another embodiment the initial value may be assumed to be zero, causing the advertisement server to not spend any budget in the first computation cycle. The advertisement server may be configured to start spending only when some default budget or portion of a budget is allocated by the spend control server to the specific advertisement server.

Accordingly, the size of the portion of the budget may subsequently be modified based on an analysis of the performance data associated with that particular advertisement server. If the advertisement server is spending more than expected or has reached its maximum budget, its budget may be increased. If the advertisement server is spending less than expected, its budget may be decreased. In various embodiments, the amount increased or decreased may be a designated amount. For example, the amount increased or decreased may be 5%, 10%, or 20%. In some embodiments, the amount increased or decreased may be dynamically configurable and may be determined based on a magnitude of a difference between the portion of the budget that was assigned for the previous time period, and the actual amount spent by the advertisement server during the previous time period. As previously discussed, the modifications associated with the spend control data objects may be determined by a spend control analyzer implemented separate from a data center or within the data center itself.

In various embodiments, the determining of the at least one modification associated with spend control data objects may be based on a non-linear analysis of received performance data. Thus, in addition to comparing an allocated budget with an amount spent by an advertisement server during a previous period or interval of time, performance data and spend control data objects associated with a previous two, three, or more time periods or intervals may be analyzed. As similarly discussed above, one or more non-linear and/or smoothing techniques may be implemented to analyze the performance data. Thus, performance data and spend control data objects generated and/or received during previous iterations of method 600 may be analyzed as well, and form the underlying basis of determining whether or not any modifications of current spend control data objects should be made. As previously stated, more recent performance data may be weighted greater. Accordingly, performance data and budget portions identified by spend control data objects generated during the most recent iteration of operation 602 and operation 606 may be given the greatest weight, while older data is given less weight. As similarly discussed above, if the older data includes data from numerous previous iterations of method 600, the older data may be combined or averaged. As previously discussed, a weighted mean may be calculated based on the most recent data and the averaged older data. In some embodiments, the weighted mean may identify or characterize an amount spent by an advertisement server that generated the performance data underlying the weighted mean. Accordingly, the weighted mean may be compared with the previously allocated budget to determine whether or not any modifications should be made, and to further determine what modification should be made.

In various embodiments, such an analysis is performed for all advertisement servers included in all data centers used to implement an advertisement campaign. In this way, portions of budgets may be calculated and provided to the different advertisement servers concurrently, and the advertisement campaign may be implemented across numerous different data centers concurrently. Furthermore, as discussed in greater detail below with reference to FIG. 7, the generation and modification of spend control data objects based on past performance data may provide fault tolerance within a spend control system used to implement method 600. For example, if a connection is lost between a performance data aggregator or a spend control analyzer and an advertisement server, the most recent performance data associated with that advertisement server will be greatly reduced, or will be zero. Accordingly, the budget allocated to that advertisement server will be reduced and will be reallocated to another advertisement server. In this way, method 600 also provides fault tolerance for connectivity issues arising from time, propagation, and data delays as well.

Returning to operation 608, if it is determined that no modifications should be made to any of the spend control data objects associated with the advertisement servers implemented across the different data centers, method 600 may terminate.

Figure 7:
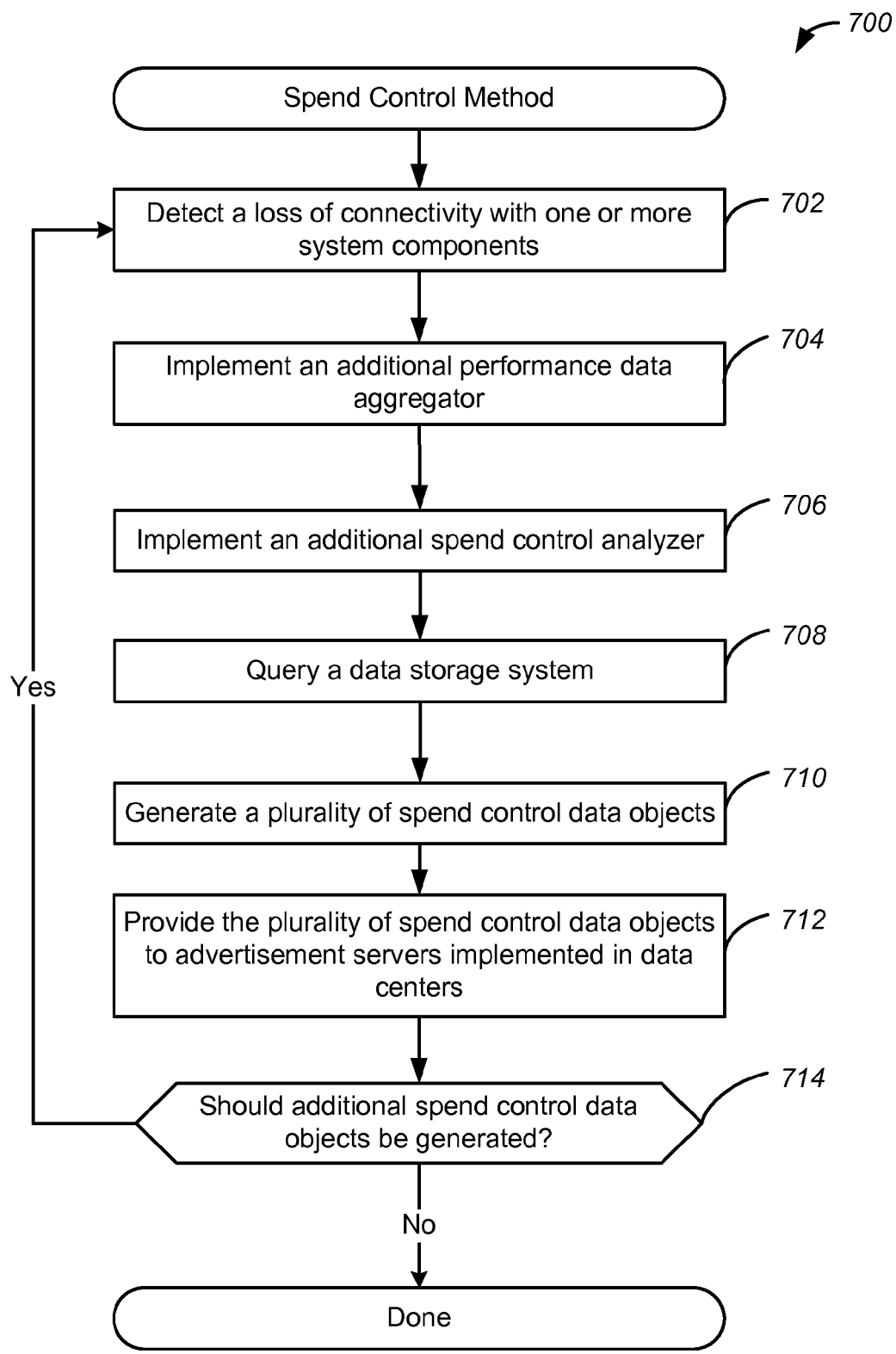
FIG. 7 illustrates a flow chart of an example of another spend control method, implemented in accordance with some embodiments.

FIG. 7 illustrates a flow chart of an example of another spend control method, implemented in accordance with some embodiments. As similarly discussed above, method 700 may be implemented to apportion a budget across several different advertisement servers located in several different data centers. Thus, method 700 may be implemented to apportion the budget based on performance characteristics of the advertisement servers such that the budget is implemented efficiently and effectively. Furthermore, method 700 may be implemented such that the budget may be implemented across all data centers even if one or more system components, such as a performance data aggregator and spend control analyzer, fails, or if there is a loss of connectivity between any of the system components and/or advertisement servers. Accordingly, method 700 may be implemented to provide fault tolerance when implementing the budget across numerous different data centers.

Method 700 may proceed to operation 702 during which a loss in connectivity may be detected. As similarly discussed above, the loss of connectivity may be between an advertisement server and other components of the spend control system. In some embodiments, the loss may be detected by a system component, such as a performance data aggregator or a spend control analyzer. The loss may be detected based on a determination that an input has not been received at a designated point in time. For example, a performance data aggregator may be configured to receive performance data periodically after a designated period of time. If no input is received at the designated time, the performance data aggregator may identify a loss in connectivity. Similarly, as discussed in greater detail below, losses of connectivity with components such as the performance data aggregator and spend control analyzer may also be detected, and one or more operations may be performed responsive to detecting a loss of connectivity.

Method 700 may proceed to operation 704 during which an additional performance data aggregator may be implemented. In some embodiments, the loss of connectivity may be associated with a particular system component, such as a performance data aggregator. For example, one or more hardware components used to implement the performance data aggregator may experience a malfunction. In some embodiments, the loss of connectivity may be detected by another system component, such as a spend control analyzer or a redundant performance data aggregator. Accordingly, an additional instance of a performance data aggregator may be implemented or instantiated in response to detecting the loss of connectivity, and the additional performance data aggregator may handle performance data aggregation for the spend control system. In various embodiments, the additional performance data aggregator may have already been implemented or instantiated as the redundant performance data aggregator, and may be brought online in response to detecting the loss of connectivity.

Method 700 may proceed to operation 706 during which an additional spend control analyzer may be implemented. In various embodiments, the loss of connectivity may be associated with a particular system component, such as a spend control analyzer. As similarly discussed above, the loss of connectivity may be due to a hardware malfunction or some other issue such as an interruption of power from a local power supply. In various embodiments, the loss of connectivity may be detected by another system component, such as a performance data aggregator or a redundant spend control analyzer. Accordingly, an additional instance of a spend control analyzer may be implemented or instantiated in response to detecting a loss of connectivity, and the additional spend control analyzer may handle the generation of spend control data objects for the spend control system. In various embodiments, the additional spend control analyzer may have already been implemented or instantiated as the redundant spend control analyzer, and may be brought online in response to detecting the loss of connectivity.

Method 700 may proceed to operation 708 during which a data storage system may be queried. In some embodiments, if connectivity with the advertisement servers has been lost and cannot be reestablished, historical data stored in a data storage system may be queried and retrieved for analysis. Accordingly, a system component, such as a spend control analyzer, may query the data storage system and retrieve historical data for an online advertisement campaign associated with the advertisement servers with which connectivity was lost. The historical data may include past performance data that was generated during previous iterations of method 700 which may have occurred prior to the loss of connectivity. In various embodiments, the historical data may also include previously generated spend control data objects. In some embodiments, operation 708 may be optionally performed. Accordingly, if connectivity with the advertisement servers has been reestablished, the data storage system might not be queried, and instead performance data may be retrieved that may be the most recent performance data which may be received from the advertisement servers with which connectivity was lost.

Method 700 may proceed to operation 710 during which a plurality of spend control data objects may be generated. As similarly discussed above, a system component, such as a spend control analyzer, may generate a plurality of spend control data objects. In various embodiments, if historical data was retrieved during operation 708, the spend control analyzer may be configured to generate the plurality of spend control data objects based on a prediction of the performance data. In some embodiments, the spend control prediction may be based on multiple snapshots of actual spend values from previous cycles. These previous values can be averaged using exponential smoothing to reduce the variance of the prediction error. In various embodiments, the previous prediction errors can also be used to produce a better prediction along the lines of a proportional-integral-derivative (PID) controller. In some embodiments, if no historical data characterizing previous iterations of method 700 was retrieved from a data storage system, and performance data characterizing recent activity at the advertisement servers was received from the advertisement servers, the spend control analyzer may generate the spend control data objects based on the received performance data, as previously discussed with reference to FIG. 5 and FIG. 6.

Method 700 may proceed to operation 712 during which the plurality of spend control data objects may be provided to advertisement servers implemented in data centers. As similarly discussed above, the spend control data objects may be provided to the advertisement servers implemented in different data centers directly, or may be provided via one or more components of the data centers themselves. The advertisement servers may receive the spend control data objects and may configure themselves based on one or more data values included in the spend control data objects.

Method 700 may proceed to operation 714 during which it may be determined whether or not additional spend control data objects should be generated. As previously discussed, such a determination may be made based on one or more designated parameters. For example, the determination may be made by a system component, such as a spend control analyzer, based on whether or not a particular duration of time has elapsed. If it is determined that additional spend control data objects should be generated, method 700 may return to operation 702. If it is determined that additional spend control data objects should not be generated, method 700 may terminate.

Figure 8:
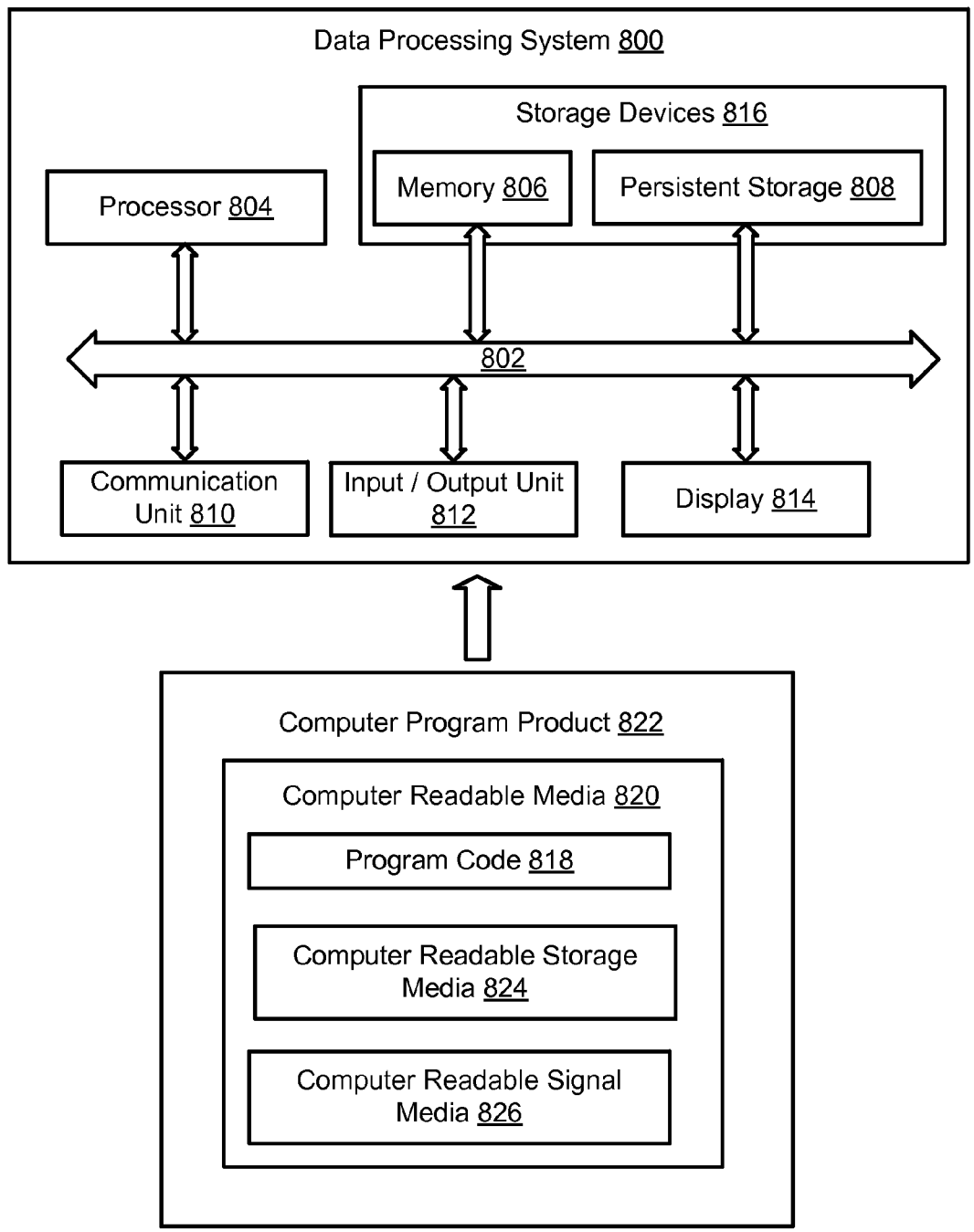
FIG. 8 illustrates a data processing system configured in accordance with some embodiments.

FIG. 8 illustrates a data processing system configured in accordance with some embodiments. Data processing system 800, also referred to herein as a computer system, may be used to implement one or more computers or processing devices used in a controller, server, or other components of systems described above, such as a spend control analyzer. In some embodiments, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, as may be included in a multi-processor core. In various embodiments, processor unit 804 is specifically configured to process large amounts of data that may be involved when processing performance data associated with one or more advertisement campaigns, as discussed above. Thus, processor unit 804 may be an application specific processor that may be implemented as one or more application specific integrated circuits (ASICs) within a processing system. Such specific configuration of processor unit 804 may provide increased efficiency when processing the large amounts of data involved with the previously described systems, devices, and methods. Moreover, in some embodiments, processor unit 804 may be include one or more reprogrammable logic devices, such as field-programmable gate arrays (FPGAs), that may be programmed or specifically configured to optimally perform the previously described processing operations in the context of large and complex data sets sometimes referred to as "big data."

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation. For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code 818.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A system comprising:
   (a) one or more client devices corresponding to one or more users, each client device configured to:
      (i) execute one or more browser applications configured to receive advertisement content, and
      (ii) generate a first set of online advertising data characterizing user actions by the one or more users at the corresponding one or more client devices;
   (b) a first data center comprising a first plurality of advertisement servers, and a second data center comprising a second plurality of advertisement servers, wherein the first plurality of advertisement servers and the second plurality of advertisement servers are configured to:
      (i) store budget data associated with a budget for an online advertisement campaign, and
      (ii) implement the online advertisement campaign over a designated period of time by generating one or more bids for placement of advertising content on the one or more browser applications executed on the one or more client devices;
   (c) one or more network servers configured to:
      (i) receive and process the one or more bids, and
      (ii) generate a second set of online advertising data comprising data events associated with providing online advertisement content based on the one or more bids, wherein the data events characterize the processing of the one or more bids and implementation of the online advertisement campaign by the first and second plurality of advertisement servers;
   (d) one or more presentation servers configured to receive:
      (i) the first set of online advertising data from the one or more client devices, and
      (ii) the second set of online advertising data from the one or more network servers;
   (e) a record synchronizer configured to periodically receive, from the one or more presentation servers, one or more records that characterize the first set of online advertising data and the second set of online advertising data, wherein the one or more records comprise log files that include one or more data values characterizing the user actions, the data events, and associated metadata;
   (f) a performance data aggregator server communicatively coupled to the first plurality of advertisement servers and the second plurality of advertisement servers, wherein the performance data aggregator server is configured to:

(i) receive performance data from the first plurality of advertisement servers and the second plurality of advertisement servers, wherein the performance data includes one or more performance data values characterizing historical bidding activity associated with the online advertisement campaign, and wherein the historical bidding activity characterizes the one or more bids generated by the first plurality of advertisement servers and the second plurality of advertisement servers, and (ii) generate one or more aggregate data objects characterizing the received performance data for one or more previous time periods, wherein the aggregate data objects are generated by:

translating temporal metadata associated with the performance data values such that the performance data received from the first and second plurality of advertisement servers include a same temporal reference point, and mapping one or more performance data values to a particular aggregate data object based on identifiers included in the performance data values;

(g) a spend control analyzer server comprising one or more processing nodes communicatively coupled to the performance data aggregator server, the first data center, and the second data center, wherein the spend control analyzer server is configured to:

(i) receive the one or more aggregate data objects, (ii) generate a plurality of spend control data objects representing a designated amount of the budget that can be spent for the online advertisement campaign over a designated time period, wherein each spend control data object of the plurality of spend control data objects is generated based on an estimate of historical bidding activity via the one or more processing nodes, wherein the estimate of historical bidding activity is based on a weighted average of a previous amount spent by at least one advertising server of the first plurality of advertising servers or the second plurality of advertising servers during the one or more previous time periods, the estimate of historical bidding activity determined by: assigning weights, based on predetermined criteria, to the received performance data for one or more previous time periods indicated by aggregate data objects for the at least one advertising server, and determining the weighted average of the previous amount spent by the at least one advertising server during the one or more previous time periods, wherein each spend control data object includes one or more budget data values indicating a budgetary constraint for the at least one advertising server, the budgetary constraint representing a portion of the designated amount of the budget assigned to the at least one advertising server, and (iii) transmit the plurality of spend control data objects to at least the first plurality of advertisement servers and the second plurality of advertisement servers, wherein the plurality of spend control data objects concurrently configure the first plurality of advertisement servers and the second plurality of advertisement servers to perform one or more advertisement operations within the budgetary constraints defined by the plurality of spend control data objects; and (h) a data storage system configured to:

(i) store and maintain historical data comprising a combination of one or more of the following: the records from the record synchronizer, previously generated aggregate data objects, and previously generated spend control data objects, and (ii) provide the historical data to the performance data aggregator server as an offline backup in response to a loss of connectivity between the performance data aggregator server and the first data center or the second data center, or (iii) provide the historical data to the spend control analyzer server as an offline backup in response to a loss of connectivity between the spend control analyzer server and the performance data aggregator server.

2. The system of claim 1, wherein the estimate of historical bidding activity is generated based, at least in part, on the received performance data.

3. The system of claim 2, wherein the estimate of historical bidding activity is based, at least in part, on a comparison of the received performance data and at least one portion of the budget identified by at least one previously generated spend control data object.

4. The system of claim 3, wherein the estimate of historical bidding activity is further based on previous performance data including one or more data values characterizing previous bidding activity associated with the online advertisement campaign.

5. The system of claim 4, wherein the estimate of historical bidding activity is based, at least in part, on the weighted average of the previous amount spent by the at least one advertising server during the one or more previous time periods and the received performance data.

6. The system of claim 1, wherein each spend control data object of the plurality of spend control data objects configures an advertisement server of the first plurality of advertisement servers or the second plurality of advertisement servers to spend an amount less than or equal to a portion of the budget represented by the spend control data object.

7. The system of claim 1 further comprising a third plurality of advertisement servers included in a third data center.

8. The system of claim 7, wherein the plurality of spend control data objects are generated based, at least in part, on historical bidding activity associated with the third data center.

9. The system of claim 1 further comprising:

an additional performance data aggregator server configured to receive performance data including one or more data values characterizing historical bidding activity associated with the online advertisement campaign in response to the performance data aggregator server malfunctioning; and an additional spend control analyzer server configured to generate a plurality of spend control data objects associated with the budget of the online advertisement campaign in response to the spend control analyzer server malfunctioning.

10. One or more non-transitory computer readable media having instructions stored thereon for performing a method, the method comprising:

(a) at one or more client devices corresponding to one or more users, (i) executing one or more browser application configured to receive advertisement content and (ii) generating a first set of online advertising data characterizing user actions by the one or more users at the corresponding one or more client devices;

(b) at a first plurality of advertisement servers and a second plurality of advertisement servers,
- (i) storing budget data associated with a budget for an online advertisement campaign, and
- (ii) implementing the online advertisement campaign over a designated period of time by generating one or more bids for placement of advertising content on the one or more browser applications executed on the one or more client devices,
wherein the first plurality of advertisement servers are included in a first data center and the second plurality of advertisement servers are included in a second data center;

(c) at one or more network servers,
- (i) receiving and processing the one or more bids, and
- (ii) generating a second set of online advertising data comprising data events associated with providing online advertisement content based on the one or more bids, wherein the data events characterize the processing of the one or more bids and implementation of the online advertisement campaign by the first and second plurality of advertisement servers;

(d) at one or more presentation servers,
- (i) receiving the first set of online advertising data from the one or more client devices, and
- (ii) receiving the second set of online advertising data from the one or more network servers;

(e) periodically receiving, at a record synchronizer, one or more records from the one or more presentation servers, wherein the one or more records characterize the first set of online advertising data and the second set of online advertising data and comprise log files that include one or more data values characterizing the user actions, the data events, and associated metadata;

(f) at a performance data aggregator server,
- (i) receiving performance data from the first plurality of advertisement servers and the second plurality of advertisement servers, wherein the performance data includes one or more performance data values characterizing historical bidding activity associated with the online advertisement campaign, and wherein the historical bidding activity characterizes bids generated by the first plurality of advertisement servers and the second plurality of advertisement servers, and
- (ii) generating one or more aggregate data objects characterizing the received performance data for one or more previous time periods, wherein the aggregate data objects are generated by:
translating temporal metadata associated with the performance data values such that the performance data received from the first and second plurality of advertisement servers include a same temporal reference point, and
mapping one or more performance data values to a particular aggregate data object based on identifiers included in the performance data values;

(g) at a spend control analyzer server comprising one or more processing nodes communicatively coupled to the performance data aggregator server, the first data center, and the second data center,
- (i) receiving the one or more aggregate data objects,
- (ii) generating a plurality of spend control data objects representing a designated amount of the budget that can be spent for the online advertisement campaign, wherein each spend control data object of the plurality of spend control data objects is generated based on an estimate of historical bidding activity,
wherein the estimate of historical bidding activity is based on a weighted average of a previous amount spent by at least one advertising server of the first plurality of advertising servers or the second plurality of advertising servers during the one or more previous time periods, the estimate of historical bidding activity determined via the one or more processing nodes by: assigning weights, based on predetermined criteria, to the received performance data for one or more time previous periods indicated by aggregate data objects for the at least one advertising server, and determining the weighted average of the previous amount spent by the at least one advertising server during the one or more previous time periods,
wherein each spend control data object includes one or more budget data values indicating a budgetary constraint for the at least one advertising server, the budgetary constraint representing a portion of the designated amount of the budget assigned to the at least one advertising server; and
- (iii) transmitting the plurality of spend control data objects to at least the first plurality of advertisement servers and the second plurality of advertisement servers, wherein the plurality of spend control data objects concurrently configure the first plurality of advertisement servers and the second plurality of advertisement servers to perform one or more advertisement operations within the budgetary constraints defined by the plurality of spend control data objects; and (h) at a data storage system,
- (i) storing and maintaining historical data comprising a combination of one or more of the following: the records from the record synchronizer, previously generated aggregate data objects, and previously generated spend control data objects, and
- (ii) providing the historical data to the performance data aggregator server as an offline backup in response to a loss of connectivity between the performance data aggregator server and the first data center or the second data center, or
- (iii) providing the historical data to the spend control analyzer server as an offline backup in response to a loss of connectivity between the spend control analyzer server and the performance data aggregator server.

11. The one or more non-transitory computer readable media recited in claim 10, wherein the estimate of historical bidding activity is based, at least in part, on a comparison of the received performance data and at least one portion of the budget identified by at least one previously generated spend control data object.

12. The one or more non-transitory computer readable media recited in claim 11, wherein the estimate of historical bidding activity is further based on previous performance data including one or more data values characterizing previous bidding activity associated with the online advertisement campaign.

13. The one or more non-transitory computer readable media recited in claim 12, wherein the estimate of historical bidding activity is based, at least in part, on the weighted average of the previous amount spent by the at least one advertising server during the one or more previous time periods and the received performance data.

14. The one or more non-transitory computer readable media recited in claim 10, wherein each spend control data object of the plurality of spend control data objects configures an advertisement server of the first plurality of advertisement servers or the second plurality of advertisement servers to spend an amount less than or equal to a portion of the budget represented by the spend control data object.

* * * * *